US005637326A

United States Patent [19]
Bogue et al.

[11] Patent Number: 5,637,326
[45] Date of Patent: Jun. 10, 1997

[54] APPARATUS FOR MAKING CHOPPED AMORPHOUS FIBERS WITH AN AIR TRANSPORT SYSTEM

[75] Inventors: Beuford A. Bogue, Broad Run; Claude Bayard; William F. Rutkowski, both of Arlington, all of Va.

[73] Assignee: Fuisz Technologies Ltd., Chantilly, Va.

[21] Appl. No.: 566,829

[22] Filed: Dec. 4, 1995

[51] Int. Cl.6 ................................................. B29C 31/04
[52] U.S. Cl. .................. 425/82.1; 425/289; 425/447; 264/115; 264/143
[58] Field of Search .............................. 425/6, 8, 308, 425/82.1, 289, 7; 264/141, 142, 143; 83/913, 402, 906

[56] References Cited

U.S. PATENT DOCUMENTS

| | | | |
|---|---|---|---|
| 480,588 | 8/1892 | Kellner | 425/82.1 |
| 816,055 | 3/1906 | Zeoller . | |
| 2,288,072 | 6/1942 | Collins | 425/82.1 |
| 2,386,401 | 10/1945 | Joyce, Jr. | 241/47 |
| 3,221,675 | 12/1965 | Forkner . | |
| 3,644,078 | 2/1972 | Tachibana et al. | 425/82.1 |
| 4,025,249 | 5/1977 | King | 264/8 |
| 4,526,525 | 7/1985 | Oiso et al. . | |
| 4,633,804 | 1/1987 | Arii | 118/52 |
| 4,773,599 | 9/1988 | Lynch et al. | 241/69 |
| 4,911,045 | 3/1990 | Mendenhall | 83/402 |
| 5,346,377 | 9/1994 | Bogue et al. . | |
| 5,380,473 | 1/1995 | Bogue et al. . | |
| 5,419,794 | 5/1995 | Hauber et al. | 264/8 |

Primary Examiner—Jay H. Woo
Assistant Examiner—Iurie A. Schwartz
Attorney, Agent, or Firm—Hoffmann & Baron

[57] ABSTRACT

An apparatus for continuously making chopped amorphous fibers that uses an air transport system. The apparatus includes a source of floss, a duct for transporting the floss while it is entrained in a stream of gaseous carrier medium, a chopper for chopping the floss, and a separator. In a preferred embodiment, the floss is chopped while it is entrained in the stream of gaseous carrier medium using a rotating ring chopper, and the chopped floss is subsequently separated using a cyclone separator.

13 Claims, 3 Drawing Sheets

APPARATUS FOR MAKING CHOPPED AMORPHOUS FIBERS WITH AN AIR TRANSPORT SYSTEM

BACKGROUND OF THE INVENTION

The present invention relates generally to production and processing of chopped amorphous fibers, and, more particularly, to a method and apparatus for continuously making such fibers using an air transport system.

Chopped amorphous fibers may be advantageously formed from floss-like materials. Various machines are known for producing such materials. One example of a machine for producing floss is the cotton candy spinning machine, in which sucrose is transformed from a granulated material into a spun candy floss product. More recently, a variety of new apparatus and methods have been discovered which can be used to produce an array of products, such as pharmaceuticals and food products, based on transformation of feedstock material to a floss. See, e.g., U.S. Pat. No. 5,346,377 issued Sep. 13, 1994, U.S. Pat. No. 5,380,473 issued Jan. 10, 1995, U.S. application Ser. No. 08/192,133 filed Feb. 4, 1994 and now U.S. Pat. No. 5,427,811 U.S. application Ser. No. 08/049,773 filed Apr. 19, 1993 now pending, U.S. application Ser. No. 08/039,973 now U.S. Pat. No. 5,447,423 filed Mar. 30, 1993, and U.S. application Ser. No. 08/266,234 filed Jun. 27, 1994 now U.S. Pat. No. 5,445,769.

Heretofore, the majority of spinning machines have been adapted for batch processes. Spun product is ejected from the spinning machine and caught in a bowl or basin from which it must be periodically removed. The efficiency of production processes can be significantly improved by incorporating floss-producing machines, such as spinning machines, into a continuous production process. Several prior art devices have attempted to incorporate candy floss spinning machines into continuous production processes.

U.S. Pat. No. 3,221,675 to Forkner discloses a spinning machine discharging floss into a rotating bowl from which the floss is gravity fed onto a conveyer belt. The gravity feed mechanism is specially adapted for co-mingling the floss with atomized materials. A duct is provided for recirculating atomized material which has not been absorbed by the floss. A primary and a secondary conveyor belt are required to compact and transport the floss for further processing.

U.S. Pat. No. 4,526,525 to Oiso et al. discloses a spinning machine discharging floss directly onto a conveyor belt. Suction is applied to the conveyor belt to aid in adhesion of the floss. The belt and suction system does not deliver the floss directly to the processing equipment; rather, the floss is discharged for further processing by an intricate series of additional conveyor belts and rollers. The Oiso et al. reference also discusses a prior art device wherein cotton candy is entrained in an air flow to aid in winding the candy about a stick. This prior art device is directed solely to collection of the candy floss, not to processing.

The devices disclosed in the Forkner and Oiso et al. references suffer from a number of disadvantages, such as expense, intricacy of required parts, susceptibility to clogging, lack of positive means to remove spun floss product from the spinner head region (with concomitant potential for buildup of product), and so on. One solution to these problems is disclosed in co-assigned, co-pending U.S. application Ser. No. 08/398,882 now pending wherein one or more rotating drums are used to collect floss product and transport it for further processing, such as chopping with a hammer mill. However, even greater economy and simplicity are still desirable. There is, therefore, a need in the prior art for an apparatus and method for continuously producing chopped amorphous fibers using a simple and economical fiber transport method, such as air transport, wherein transport of floss for processing is carried out primarily by air transport without the need for complex apparatus such as conveyor belts and rollers.

SUMMARY OF THE INVENTION

The present invention, which addresses the needs of the prior art, provides an apparatus and method for the continuous production of fibers and of chopped fibers with an air transport system. The apparatus includes a source of floss, such as a spinner head, which provides floss in a form for transport by a continuous stream of gaseous carrier medium flowing in a duct. A chopper is provided for chopping the floss, and a separator is included for separating the floss from the gaseous carrier medium.

Surprisingly, selection of a preferred chopper, as described herein, permits production of uniform-length, free-flowing, and easily separated fibers without objectionable levels of fines. This allows economical separation, for example, with a cyclone separator. Prior art devices using a hammer mill have tended to produce excessive levels of fines.

In a preferred embodiment of the present invention, the duct is connected at one end to the source of floss and at the other end to the separator, with the chopper being located in an intermediate portion of the duct. In this embodiment, floss entrained in the stream of gaseous carrier medium is continuously chopped in the presence of the stream and the chopped floss is separated from the stream.

In the preferred embodiment, the preferred form of separator is a cyclone separator and the preferred form of chopper is a rotating ring chopper. The cyclone separator is preferred due to its capability to quickly separate floss from air. Further, the preferred embodiment may include provisions for infusion of additives into the floss, and for inducement of a tangential velocity component in the stream of gaseous carrier medium to aid in entrainment of the floss.

In a method which can employ the apparatus of the preferred embodiment, floss to be chopped is entrained in a stream of gaseous carrier medium and chopped while being carried in the steam, and the chopped fibers are then separated from the stream.

The preferred method may also include a step of infusing additives into the floss. Further, a cyclone separator is preferred for the separating step, and a rotating ring chopper for the chopping step. Finally, the method can include inducement of a tangential velocity in the stream of gaseous carrier medium during the entrainment step.

As a result, the present invention provides an apparatus and method for continuous production of chopped amorphous fibers with an air transport system which offers efficiency, reliability, and simplicity. The present invention further provides an apparatus and method for continuous production of chopped amorphous fibers resulting in fibers which are uniform-length, easy to separate and free-flowing. The present invention still further provides an apparatus and method for the continuous production of chopped amorphous fibers that permits ready infusion of additives and efficient entrainment of floss feedstock while minimizing production of fines.

For a better understanding of the present invention, together with other and further objects and advantages, reference is made to the following description, taken in conjunction with the accompanying drawings, and its scope will be pointed out in the appended claims.

DETAILED DESCRIPTION OF THE INVENTION

Figure 1:
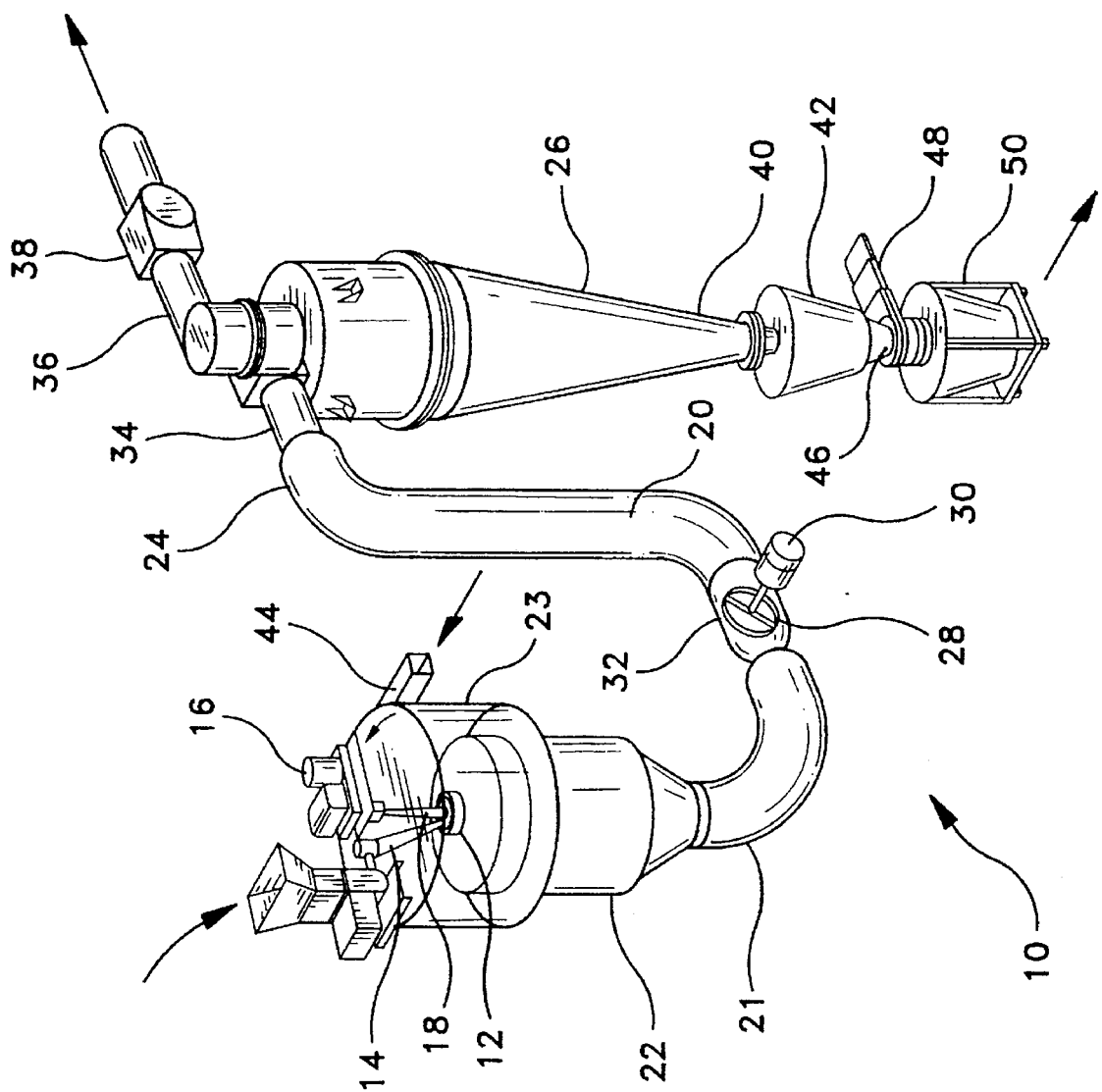
FIG. 1 is a perspective view of an apparatus for continuously making chopped amorphous fibers with an air transport system, in accordance with a preferred embodiment of the present invention.

Referring to the drawings, FIG. 1 shows an apparatus 10 for continuously making chopped amorphous fibers with an air transport system. The apparatus includes a source of floss, such as floss spinner head 12, which provides floss in a form for transport by a continuous stream of gaseous carrier medium. As discussed below, many other sources of floss can be used with the invention. Spinner head 12 can be provided with a feedstock supply duct system 14 for introduction of feedstock into the head. Spinner head 12 can be driven by spinner motor assembly 16 driving spinner head shaft 18.

Floss processing duct 20 has a first end 21 that is in fluid communication with the floss spinner head. First end 21 is formed with enlarged diameter floss receiving region 22. Typical dimensions are, for example, an inside diameter of 2–24 inches for duct 20 enlarged to 24–60 inches at the floss receiving region 22.

Floss receiving region 22 is in fluid communication with outer heavy particle trap 23. Heavy particles such as beads or spheres are sometimes produced along with the floss in the spinner head 12. In order to prevent contamination of the floss with such particles, trap 23 is provided. Since the heavy particles have a greater momentum than the lighter floss fibers (for the same velocity), they will travel farther outward from the spinner head and be captured by trap 23.

Gaseous medium injection duct 44 interfaces, preferably tangentially, with first end 21 of duct 20, preferably via particle trap 23. Floss processing duct 20 also has a second end 24 in fluid communication with a separator such as cyclone separator 26.

A chopper such as in-line rotating ring chopper 28 driven by chopper motor 30 is located in intermediate portion 32 of floss processing duct 20. Preferably, chopper 28 employs one ring forming 2 blades. It will be appreciated that as the ring rotates it presents both its upper and lower half to the stream of gaseous carrier medium with entrained floss, and thus each half acts like a blade, effectively forming 2 blades. Chopper motor 30 is preferably a variable speed motor or is coupled to chopper 28 by a suitable transmission so that the angular velocity of the blades of chopper 28 can be varied, for reasons discussed below. Duct 20 is sized and shaped to accommodate chopper 28, which can have, for example, a typical blade diameter of 2–24 inches. Cyclone separator 26 has inlet 34 in fluid communication with second end 24 of floss processing duct 20. Separator 26 also has gas outlet 36 in fluid communication with the inlet of a flow-inducing device such as blower 38, and separated floss outlet 40 disposed in communication with chopped floss trap 42. Chopped floss trap 42 can have an outlet 46 equipped with a slide gate valve 48 disposed over chopped floss cart 50, and is preferably mounted on a scale to permit gravimetric measurement of the proportion of floss to additives.

In operation, blower 38 is activated to provide a negative gauge pressure at gas outlet 36 of cyclone separator 26, causing gaseous carrier medium to be drawn into floss processing duct 20 through gaseous medium injection duct 44, thereby establishing a flow of gaseous carrier medium. It will be appreciated that some gaseous medium may also be drawn into duct 20 through, for example, feedstock supply duct system 14 or adjacent areas, depending on the exact details of construction.

In FIG. 1, gaseous medium injection duct 44 is shown in direct fluid communication with the environment surrounding the apparatus 10. It is to be understood that the gaseous carrier medium may include, for example, ambient air, filtered air, temperature and/or humidity controlled air, nitrogen ($N_2$) or other inert gas, and the like, depending on the type of material being processed and the relevant parameters. Sources of these media can be connected to duct 44, if desired. Further, while it is preferred to establish a negative gauge pressure at gas outlet 36 with blower 38, one could instead establish a positive gauge pressure at the inlet to the apparatus 10.

Feedstock is fed into floss spinner head 12 by feedstock supply duct system 14, and floss spinner head 12 is turned by spinner motor assembly 16 acting through spinner head shaft 18. Floss issuing from the spinner head is entrained into the flow of gaseous carrier medium. Entrainment is aided by a substantial tangential velocity component imparted to the flow by gaseous carrier medium entering through gaseous medium injection duct 44.

It should be noted that floss issuing from spinner head 12 will also be induced by gravity to fall downward in the same direction as the axial velocity component of the flow of gaseous carrier medium, thereby aiding entrainment. However, in practicing the present invention, it is preferable that the velocity field in the gaseous carrier medium should result in a fluid drag force on the floss that dominates the force produced on the floss by gravity, so that horizontal transport is possible without undue settling of the entrained material. In this way, other components of the apparatus can be located at spatially diverse locations, and need not be underneath the spinner head, as in transport systems relying primarily on gravity.

The gaseous carrier medium with entrained floss flows through floss processing duct 20 until rotating ring chopper 28 is encountered. Chopper 28 chops substantially all floss entrained in the stream of gaseous carrier medium. While all suitable types of choppers are considered to be within the scope of the invention, the rotating ring chopper is preferred. As noted, the chopper preferably has one ring forming two blades, so that substantially all floss impinging on the chopper is chopped. Substantially complete chopping of all floss is aided by operating the chopper blades at an appropriate angular velocity, which may be adjusted with the previously mentioned variable speed motor or transmission. It has been found that the velocity of the stream of gaseous carrier medium, the type of floss, and the angular velocity of the chopper are factors influencing the size of the chopped floss.

Use of the in-line rotating ring chopper yields surprising results compared to, for example, a hammer mill, in that so few fines are produced during the chopping process that all the required separation can be accomplished with the cyclone separator. In the prior art, and in embodiments of the invention employing a hammer mill as a chopper, production of fines during the chopping process is expected, so that a dust bag and bag house (not shown in the drawings) would have to be employed downstream of the gas outlet 36 to remove the residual entrained fines. Consequently, use of the in-line rotating ring chopper enables one to practice the present invention in an efficient and economical manner that compares favorably with other continuous floss-processing methods.

The rotating ring chopper also provides substantially uniform length chopped fibers that are easy to separate and free-flowing. It is to be noted that "amorphous" as used herein refers to the substantially non-crystalline structure of the fibers envisioned for most frequent production by the apparatus, rather than to the uniformity of the fiber length in the as-processed condition. While it is envisioned that the apparatus and method of the present invention have their greatest utility in processing amorphous floss materials, all materials capable of being formed into floss and processed as described herein, whether amorphous or crystalline, are considered to be within the scope of the invention.

As an alternative to a single rotating ring chopper, two such choppers may be employed in series, depending on the material being processed and the velocity of the stream of gaseous carrier medium. It is believed that chopping efficiency could be improved by employing 2 choppers with drive shafts positioned at right angles to each other, as shown in FIG. 2.

Figure 2:
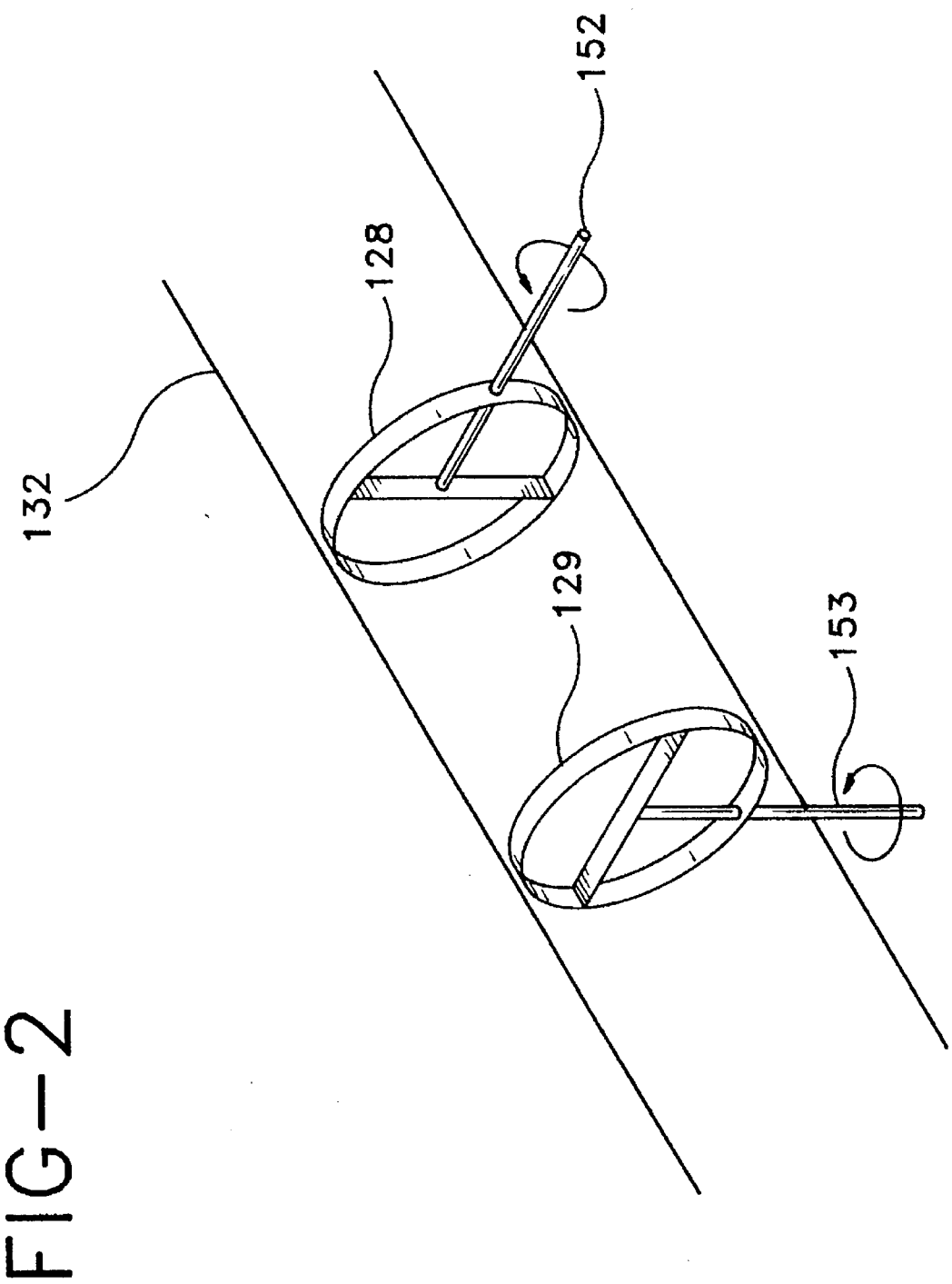
FIG. 2 is a perspective view of an arrangement of choppers which may be employed with the invention.

In FIG. 2, elements similar to those in FIG. 1 have received the same reference number incremented by 100. Chopper 128 rotates about drive shaft 152, driven by a motor or other means not shown, while complementary second chopper 129 rotates about drive shaft 153 which is substantially at right angles to drive shaft 152. Both choppers are located in intermediate portion 132 of the floss processing duct.

Figure 3:
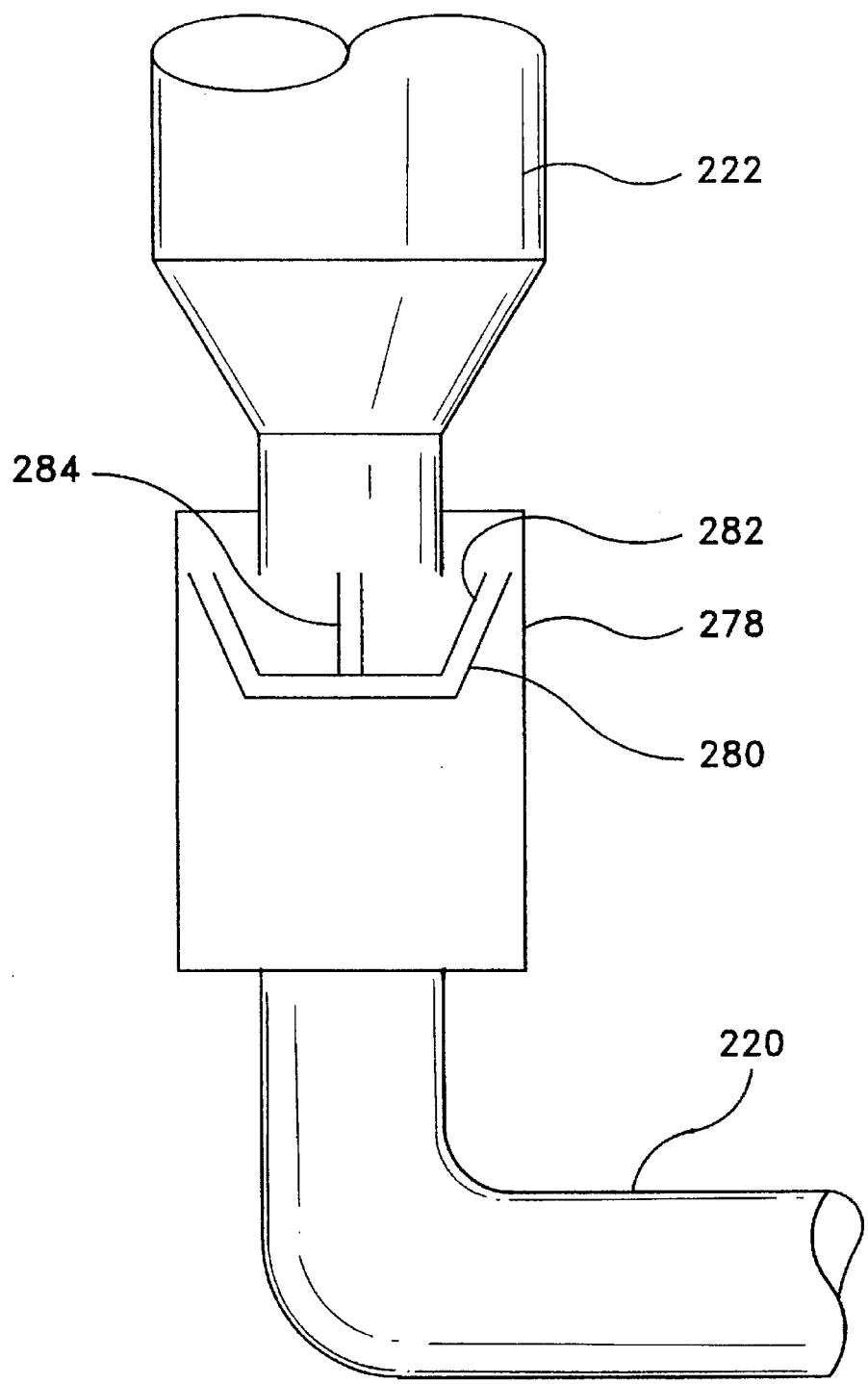
FIG. 3 is a schematic elevational view of a comill which may be employed with the invention.

As an alternative to the rotating ring chopper(s), a comill, as manufactured by Quadro. Engineering, Inc., of Ontario, Canada, may be employed. Referring to FIG. 3, wherein elements similar to those in FIG. 1 have received the same reference number incremented by 200, the comill 278 includes a stationary conical screen 280 with a mating rotating impeller 282 which is adapted to closely fit the shape of the screen 280. The comill is preferably situated below floss receiving region 222. The remainder of the apparatus is the same as in FIG. 1. Blade 282 is driven by shaft 284 via a motor or other device (not shown).

Referring again to FIG. 1, the stream of gaseous carrier medium containing the entrained chopped floss is drawn into inlet 34 of cyclone separator 26, where the entrained floss fibers are continuously separated from the gaseous stream by centrifugal force, without interruption of the stream. The separated fibers are collected in chopped floss trap 42, and can be emptied into chopped floss cart 50 through slide gate valve 48 when required or desired. The substantially particle-free stream of gaseous carrier medium passes through gas outlet 36 of cyclone separator 26, through blower 38, and ultimately to the atmosphere.

In many floss-processing applications, for example, in the production of pharmaceuticals and chewing-gum bases, it is desirable to infuse one or more additives such as, for example, medicaments, preservatives, flow agents, coloring agents, or flavorings into the unchopped floss or chopped fibers during processing. Accordingly, an additive infuser (not shown) such as a nozzle for liquid additives or a vibrating tray for solid additives can be located at any convenient point in the apparatus, either upstream or downstream of chopper 28. One preferred location for such an additive infuser is between floss receiving region 22 and chopper 28. As an alternative, the additives may be mixed with the feedstock that is fed into spinner head 12.

A wide variety of floss-producing devices can be employed with the present invention. These may include, for example, an ordinary cotton-candy spinning machine such as that disclosed in U.S. Pat. No. 816,055 to Zoeller. However, it is envisioned that the greatest applicability of the present invention will be with modern devices such as the heated screw extruder with ejector used to produce floss by flash shear methods, as invented by Bogue et al., and disclosed in U.S. Pat. No. 5,380,473 issued Jan. 10, 1995, and even more so with modern flash-flow floss production apparatus.

Flash-flow apparatus include, for example, those disclosed in co-assigned United States applications Ser. Nos. 08/330,938 filed Oct. 28, 1994 now U.S. Pat. No. 5,458,223; 08/266,234 filed Jun. 27, 1994 now U.S. Pat. No. 5,445,769; 08/049,773 filed Apr. 19, 1993 now pending; 08/039,973 filed Mar. 30, 1993 now U.S. Pat. No. 5,447,423; 08/192,133 filed Feb. 4, 1994 now U.S. Pat. No. 5,427,811; and in co-assigned U.S. Pat. No. 5,346,377 issued Sep. 13, 1994; the disclosures of all of which are incorporated herein by reference. All of the foregoing floss-producing devices are listed by way of example rather than limitation, and it is to be understood that use of other types of floss producing devices is within the scope of the invention.

As disclosed in the patents and applications listed in the preceding paragraphs, a great number of floss products, made from a range of feedstocks and additives, can be produced with currently known floss-producing devices. Processing of all of the above-disclosed floss products, feedstocks, and additives, as well as other floss products, feedstocks, and additives, are considered to be within the scope of the present invention. The air transport process is particularly suited to flash-flow and flash-shear floss production because of the ability to handle high-volume production and additive infusion, as well as the ability to provide relatively uniform-length chopped fibers.

In a preferred method for the continuous production of chopped fibers that can employ the apparatus of the preferred embodiment, floss to be chopped is entrained in a stream of gaseous carrier medium, chopped while being carried in the stream, and separated from the stream. Entrainment of the floss into the stream can be assisted by provision of a substantial tangential velocity to the stream of gaseous carrier medium during the entrainment step. Additives can be infused into the floss or the chopped fibers, and the chopped fibers can be collected after being separated from the stream of gaseous carrier medium.

A wide variety of materials can be used to construct apparatus according to the present invention. The exact materials selected will depend on a number of factors, including chemical compatibility with the feedstock and additives to be processed. Ducts can be readily made of galvanized steel, plastic materials, painted steel, aluminum, glass, or even stainless steel (for example, for pharmaceutical processing). Toxicity and wear resistance are important considerations in selecting a duct material.

Portions of process equipment subject to erosion, such as cutter blades, can be manufactured of stainless steel, alloy steel, or other suitable materials, while other components of such equipment can be made of, for example, mild steel or plastic materials. Polytetrafluoroethylene can be applied as needed to surfaces of the apparatus to prevent adhesion of the feedstock or additives. Surfaces not in contact with the product can be painted with a non-toxic paint.

EXAMPLE

An apparatus according to the invention was set up using a 4 inch diameter rotating ring chopper, model number 400068 as manufactured by Fuisz Technologies Ltd., and a model 95-1127B cyclone separator as manufactured by Airecon Mfg. Corp. A mass flow rate of 25 pounds per hour of feedstock consisting of sugar and excipients was supplied to the spinner head. The spinner head was 5 inches in diameter, was operated at 3600 RPM, and was maintained at a temperature of approximately 360° F.

Floss emanating from the spinner head was entrained into a stream of ambient air at 70° F. and a volumetric air flow rate of 200 cubic feet per minute. The air flow was established by a blower providing a pressure rise of 7.5 inches of water at the indicated flow. The resultant product was a uniformly chopped amorphous fiber having an average length of 0.02 inches, with substantially no fines in the product or the exhaust.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. An apparatus for continuous production of chopped fibers comprising:

a flow-inducing device which establishes flow of a continuous stream of gaseous carrier medium;

a source of floss which provides Said floss in a form for transport by said continuous stream of gaseous carrier medium;

a floss-processing duct disposed in fluid communication with said flow-inducing device for bounding said flow of said stream, said duct having a first end in fluid communication with said source of floss, an intermediate portion having a size and shape sufficient to accommodate floss chopping, and a second end;

a chopper which chops floss to reduce said floss to fibers, said chopper having a moving chopping member, said chopper being mounted in said intermediate portion of said duct and having a configuration which chops substantially all floss carried in said stream while said floss is suspended in said stream; and a separator which receives and separates said fibers from said stream of carrier medium without interruption of flow of said stream, said separator being disposed in fluid communication with said second end of said floss-processing duct;

whereby floss is continuously produced and chopped to fibers in the presence of said continuous stream of gaseous carrier medium, and said chopped fibers are separated from said continuous stream of gaseous carrier medium.

2. The apparatus of claim 1, wherein said chopper is a rotating ring chopper having a ring forming a blade.

3. The apparatus of claim 2, wherein said separator is a cyclone separator.

4. The apparatus of claim 2, wherein said ring of said rotating ring chopper forms two blades.

5. The apparatus of claim 4, wherein said separator is a cyclone separator..

6. The apparatus of claim 1, wherein said separator is a cyclone separator.

7. The apparatus of claim 6, further comprising a chopped fiber collecting system disposed underneath a separated floss outlet of said cyclone separator.

8. The apparatus of claim 1, further comprising an additive infuser disposed in communication with said floss-processing duct for infusion of additives into said floss.

9. The apparatus of claim 1, wherein said first end of said floss-processing duct is substantially circular in cross-section, further comprising a gaseous medium injection duct interfacing tangentially with said first end of said floss-processing duct, said gaseous medium injection duct and said first end of said floss-processing duct together establishing a substantial tangential velocity component in said continuous stream of gaseous carrier medium for efficient entrainment of said floss into said stream.

10. The apparatus of claim 1, wherein said chopper is a comill.

11. The apparatus of claim 1, wherein said chopper is a first rotating ring chopper having a ring forming a blade and having an axis of rotation, further comprising a second rotating ring chopper having a ring forming a blade and having an axis of rotation substantially at a right angle to said axis of rotation of said first rotating ring chopper.

12. The apparatus of claim 1, wherein said source of floss is a spinner head and said first end of said floss-processing duct is formed with an outer heavy particle trap to receive and trap heavy particles ejected by said spinner head along with said floss.

13. 25. The apparatus of claim 1, wherein said source of floss is located within said first end of said floss-processing duct.

* * * * *